United States Patent
Lin et al.

(10) Patent No.: US 8,213,520 B2
(45) Date of Patent: Jul. 3, 2012

(54) COMPRESSION METHOD FOR DISPLAY FRAMES OF QFHD (QUAD FULL HIGH DEFINITION) RESOLUTION AND SYSTEM THEREOF

(75) Inventors: Youn-Long Lin, Hsinchu (TW); Hui-Ting Yang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 409 days.

(21) Appl. No.: 12/642,928

(22) Filed: Dec. 21, 2009

(65) Prior Publication Data

US 2010/0158104 A1    Jun. 24, 2010

(30) Foreign Application Priority Data

Dec. 23, 2008   (TW) .............................. 97150296 A

(51) Int. Cl.
*H04N 11/04* (2006.01)
(52) U.S. Cl. .......... 375/240.25; 375/240.27; 375/240.26
(58) Field of Classification Search ............. 375/240.25, 375/240.27, 240.26
See application file for complete search history.

(56) References Cited

U.S. PATENT DOCUMENTS

| | | | | |
|---|---|---|---|---|
| 4,626,839 | A | * | 12/1986 | O'Malley ....................... 345/501 |
| 5,598,483 | A | * | 1/1997 | Purcell et al. .................. 382/232 |
| 5,923,783 | A | * | 7/1999 | Kawauchi et al. ............. 382/233 |
| 5,999,654 | A | * | 12/1999 | Toujima et al. ................ 382/232 |
| 6,947,485 | B2 | * | 9/2005 | Owen et al. .............. 375/240.16 |
| 7,587,524 | B2 | * | 9/2009 | Cho et al. .......................... 710/22 |
| 2006/0002475 | A1 | * | 1/2006 | Fuchs ...................... 375/240.24 |

* cited by examiner

*Primary Examiner* — David Czekaj
*Assistant Examiner* — Jonathan Torchman

(57) ABSTRACT

A compression method and a compression system for display frames of QFHD (quad full high definition) resolution are provided and applied to the image encoding/decoding environment of the H.264/AVC image encoding standard of the QFHD resolution and the effective dictionary base compression and de-compression algorithm, the image data compression rate can be tremendously raised at the resolution of 1080 HD (High Definition) content and the average memory data rate is greatly decreased. Hence only a bus with a lower frequency as 57 MHz can be done for the real-time of the resolution of 1080 HD content.

4 Claims, 8 Drawing Sheets

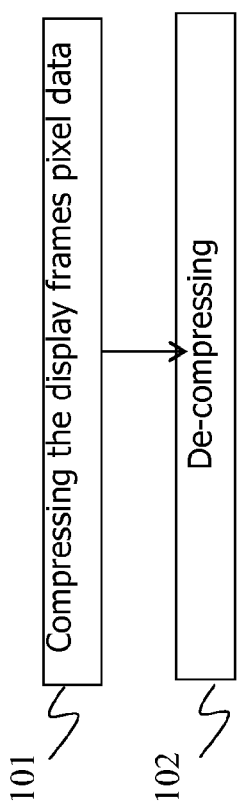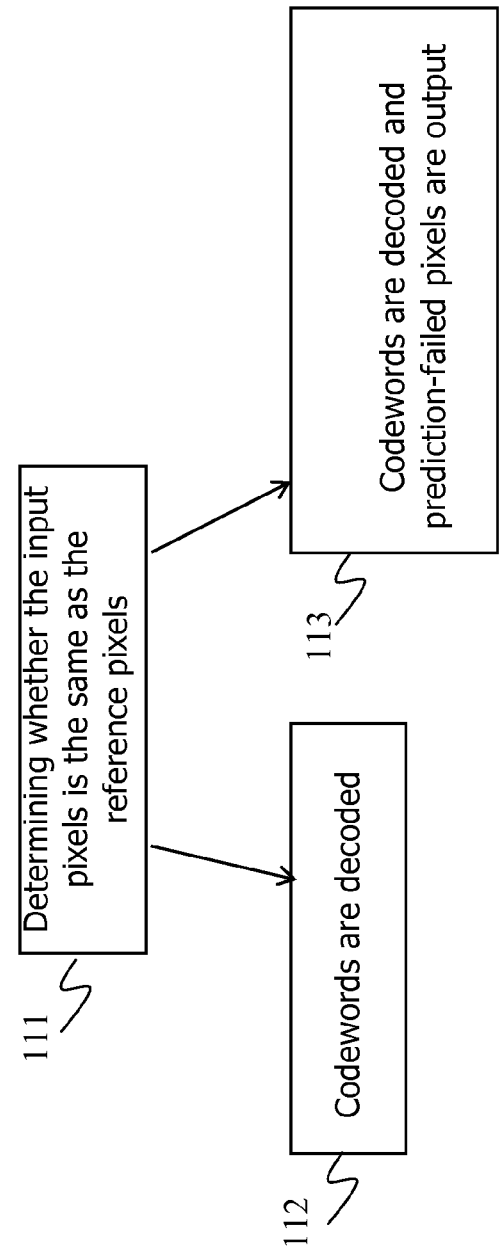

| input | | output | |
|---|---|---|---|
| Pixel data | Pixel dictionary | codeword | Prediction-failed pixel |
| 8'h71 | {8'hff, 8'h00, 8'h01} | 2'b11 | 8'h71 |
| 8'h72 | {8'h70, 8'h71, 8'h72} | 2'b10 | - |
| 8'h72 | {8'h71, 8'h72, 8'h73} | 2'b01 | - |
| 8'h73 | {8'h71, 8'h72, 8'h73} | 2'b10 | - |
| 8'h74 | {8'h72, 8'h73, 8'h74} | 2'b10 | - |
| 8'h74 | {8'h73, 8'h74, 8'h75} | 2'b01 | - |
| 8'h72 | {8'h73, 8'h74, 8'h75} | 2'b11 | 8'h72 |
| 8'h71 | {8'h71, 8'h72, 8'h73} | 2'b00 | - |

COMPRESSION METHOD FOR DISPLAY FRAMES OF QFHD (QUAD FULL HIGH DEFINITION) RESOLUTION AND SYSTEM THEREOF

CROSS-REFERENCE TO RELATED APPLICATION

This application claims foreign priority from a Taiwan Patent Application, Ser. No. 097150296, filed on Dec. 23, 2008.

BACKGROUND OF THE INVENTION

1. Field of the Invention

The present invention generally relates to a compression method for display frames of QFHD (quad full high definition) resolution and a system thereof, more particularly to a compression method and a system thereof that are applied to the image encoding/decoding environment of the H.264/AVC image encoding standard of the QFHD resolution.

2. Description of the Prior Art

H.264 belongs to the $10^{th}$ part of MPEG-4, and it is normally called H.264/AVC (Advanced Video Coding). H.264/AVC is a high compression digital image encoding/decoding standard provided by the JVT Association of combining the VCEG Association and the MPEG Association. With the same quality and based on some advanced encoding tools, H.264/AVC may save the bit rates of 50% and 38% respectively comparing to MPEG-2 and MPEG-4. With the comparison of H.264/AVC and MPEG-4 Part 2/ASP, H.264/AVC is going to achieve the goals of videos with less data streams and higher quality. Therefore, H.264/AVC is a better choice for the conditions of middle and higher data rates.

With the increase of the resolution to image encoding, the data to be processed in a certain time period may also be highly raised, such as the display frames of the H.264/AVC image encoding standard at the resolution of 1080 HD (High Definition) content. However, such data to be processed are stored in an external DRAM with a lower speed. To increase the bandwidth of the memory is necessary so as to avoid system bottleneck.

According to the patent references of the Republic of China, the issued numbers are I297134, I297252, I295538, I287403, and I283534, and the technologies of such patents are in the field of image encoding/decoding, but not for the image encoding/decoding technology of the H.264/AVC image encoding standard of the QFHD resolution.

With references to the patents of the United States of America, the issued numbers are U.S. Pat. No. 7,333,664, titled as image compression method capable of reducing tile boundary distortion, U.S. Pat. No. 7,024,046, titled as system and method for the lossless progressive streaming of images over a communication network, U.S. Pat. No. 6,314,452, titled as system and method for transmitting a digital image over a communication network, U.S. Pat. No. 5,754,698, titled as image signal encoding device hAVCing first and second encoding means, U.S. Pat. No. 6,011,901, titled as compressed digital video record and playback system, and U.S. Pat. No. 5,832,128, titled as picture signal encoding and decoding apparatus, and the technologies of such patents are in the field of image encoding/decoding, but not for the image encoding/decoding technology of the H.264/AVC image encoding standard of the QFHD resolution.

In accordance with aforesaid, the following topic may be seriously considered to the skilled people in the art. That is, a compression method and a compression system for display frames of QFHD (quad full high definition) resolution are applied to the image encoding/decoding environment of the H.264/AVC image encoding standard of the QFHD resolution and the effective dictionary base compression and de-compression algorithm, the image data can be effectively compressed at the resolution of 1080 HD (High Definition) content, and only a bus with a lower frequency as 57 MHz can be done for the real-time of the resolution of 1080 HD content.

SUMMARY OF THE INVENTION

In view of the aforementioned disadvantages and problems of the prior art, the primary objective of the present invention is to provide a compression method and a compression system for display frames of QFHD (quad full high definition) resolution, which are applied to the image encoding/decoding environment of the H.264/AVC image encoding standard of the QFHD resolution. By way of the display frame compression system applying to the effective dictionary base compression and de-compression algorithm, the image data compression rate can be highly raised and the average memory data rate is greatly decreased.

The secondary objective of the present invention is to provide a compression method and a compression system for display frames of QFHD (quad full high definition) resolution, which are applied to the image encoding/decoding environment of the H.264/AVC image encoding standard of the QFHD resolution. While proceeding the compression method for the display frames, the image data compression rate can be tremendously increased at the resolution of 1080 HD (High Definition) content, for instance, the compression rate of 54%; and the average memory data rate is greatly decreased, such as the decreased average memory data rate of about 33%. Hence only a bus with a lower frequency as 57 MHz can be done for the real-time of the resolution of 1080 HD content.

As aforesaid, the present invention provides a compression method and a compression system for display frames of QFHD (quad full high definition) resolution, which are applied to the image encoding/decoding environment of the H.264/AVC image encoding standard of the QFHD resolution. The compression system comprises at least one encoder and a decoder. Due to that of the display frames being compressed, the data cycles of accessing the display frames may be shorter, and the penalty cycles is less, too.

An input port of the encoder is connected to a display write memory access unit (DWMAU). After the display frame pixels are compressed, the encoder writes the compressed data into an external DRAM. The encoder comprises an internal SRAM, a display compressor core with a compression algorithm, a display compressor address generator (DCAG), and a display frame compression finite state machine (DFCFSM).

The decoder fetching the compressed data from the external DRAM via the AHB, continuously de-compressing the compressed data to display frame pixels, then transmitting the display frame pixels to a display controller. The decoder comprises a compressed display frame SRAM, a display de-compression core with a de-compression algorithm, a display de-compressor address generator (DDAG), and a display frame de-compression finite state machine (DFDFSM).

The method for compressing display frame pixel data of the encoder with the internal SRAM, the display compressor core with the compression algorithm, the display compressor address generator (DCAG), and the display frame compression finite state machine (DFCFSM) comprises the steps of the display frame pixels being transmitted to the display frame compression finite state machine (DFCFSM); the display frame compression finite state machine (DFCFSM) categorizing the display frame pixels as Y, Cb and Cr; the display frame compression finite state machine (DFCFSM) transmitting the Y, Cb and Cr to a display compressor core; the display compressor core compressing the Y, Cb and Cr to a parallel type and transmitting the compressed Y, Cb and Cr to the display compressor address generator (DCAG); the display compressor address generator (DCAG) writing the compressed data into the internal SRAM; and the display compressor address generator (DCAG) writing the compressed data in the internal SRAM into the external DRAM.

While compressing display frame pixel data through the compression system of the present invention, the most situations are that the difference between a display frame pixel and a previous display frame pixel is 1, or the display frame pixel is the same as the previous display frame pixel. Therefore the way of predicting each pixel based on a previous pixel thereof may get rid of most residue data. The encoder has a pixel dictionary with three reference pixels. The initial values of the three reference pixels are 8'hff, 8'h00 and 8'h01 respectively. The display frame pixel is input into the input port of the encoder for calculation, an output port of the encoder outputs encoded codewords and prediction-failed pixels. Each input pixel by the encoder is compared with the three reference pixels in the pixel dictionary. If the input pixel is the same as any of the three reference pixels, the codewords may then be encoded as a dictionary pointer as 2' b00, 2' b01 or 2' b10 corresponding to a reference pixel, and none of the prediction-failed pixels will be output; otherwise, the codewords are encoded, that is, one codeword is encoded as 2' b11, and the input pixel may be output in the form of a prediction-failed pixel. After encoding the input pixels, the pixel dictionary is updated according to the input pixels. Even an input pixel is the same as any of the reference pixels, the pixel dictionary is still updated. That is, the correlation of most display frame pixels and adjacent pixels thereof is about height. In addition, using the dictionary pointers to clearly indicate the update of the reference pixels is unnecessary, on the contrary, the comparison is proceeded sequentially according to the input pixels, then all the reference pixels are updated simultaneously.

For the compression method, the quantity of the reference pixels is $2^n-1$, wherein n is the width of a codeword, the possibility to hit the target of a prediction is raised with the increase of n. However, the total bit number of a codeword is increased as well. Thus, a best mode for the length of a codeword can be chosen so as to optimize the compressed data.

The method for de-compressing display frame pixel data of the decoder with the compressed display frame SRAM, the display de-compressor core with the de-compression algorithm, the display de-compressor address generator (DDCAG), and the display frame de-compression finite state machine (DFDFSM), and the display frame de-compression finite state machine (DFDFSM) comprises the steps of the display de-compressor address generator fetching the compressed data from the external DRAM and storing the compressed data into the compressed display frame SRAM; the display de-compressor address generator transmitting part of the codewords and/or prediction-failed pixels from the compressed display frame SRAM to the display de-compression core; the display de-compressor address generator transmitting part of the codewords and/or prediction-failed pixels from the compressed display frame SRAM to the display de-compression core with the de-compression algorithm; the display de-compressor core de-compressing the compressed data to display frame pixels; the display de-compressor core de-compressing the compressed data as an individual Y, an individual Cb and an individual Cr respectively and transmitting the Y, Cb and Cr to a display frame de-compression finite state machine (DFDFSM); and the display frame de-compression finite state machine concatenating the de-compressed Y, Cb and Cr as a special arrangement defined by the display controller, the display frame de-compression finite state machine then transmitting the special arrangement pixels to the display controller.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 4 illustrates a flow chart of the compression method for display frames of QFHD (quad full high definition) resolution;

FIG. 5 illustrates a detail flow chart of compressing the display frame pixel data of FIG. 4;

DETAILED DESCRIPTION OF THE INVENTION

Figure 1:
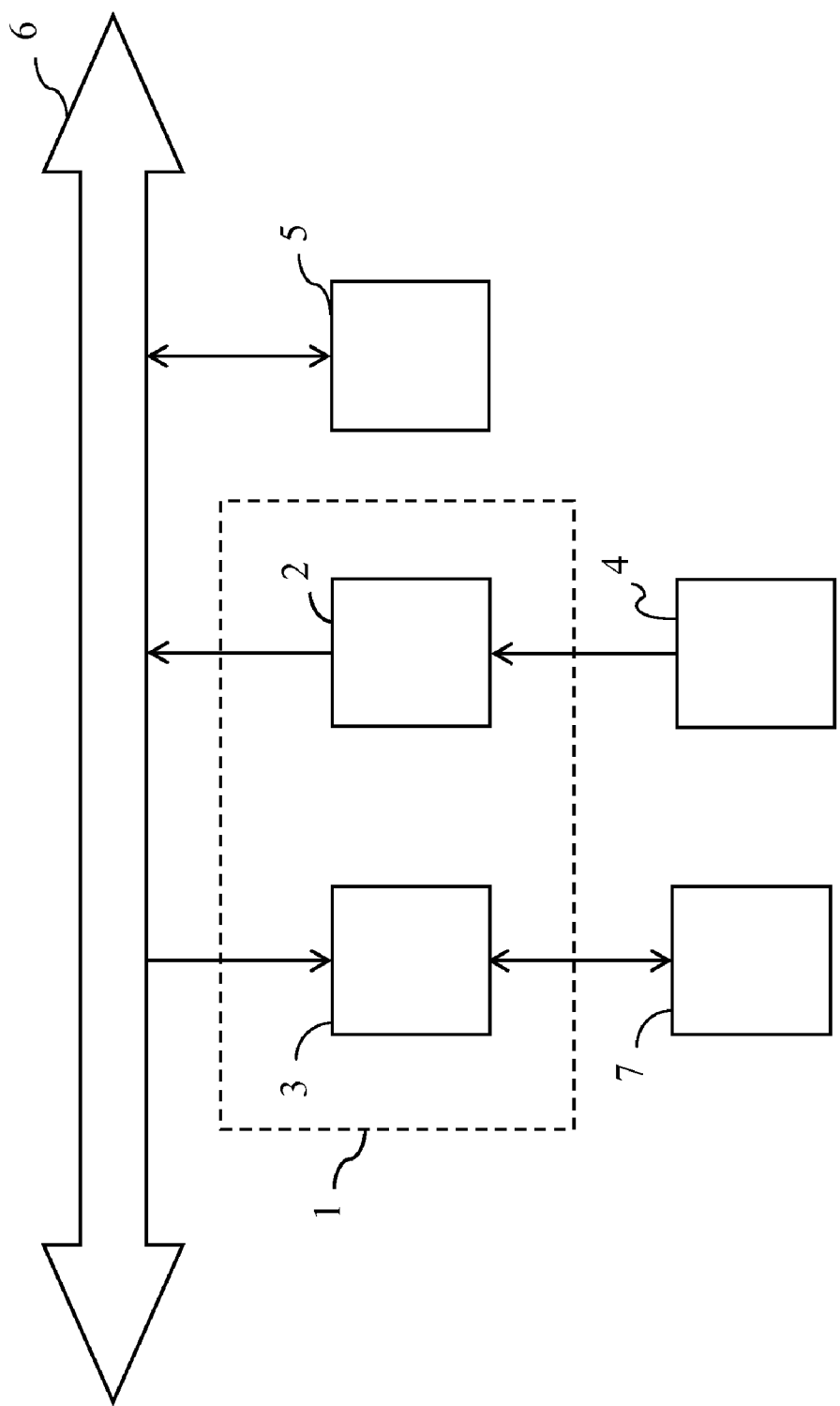
FIG. 1 illustrates a schematic view of the compression system for display frames of QFHD (quad full high definition) resolution of the present invention.

With reference to FIG. 1, which illustrates a schematic view of the compression system for display frames of QFHD (quad full high definition) resolution of the present invention. As shown in FIG. 1, the compression system 1 for display frames of QFHD (quad full high definition) resolution, which is applied to the image encoding/decoding environment of the H.264/AVC image encoding standard of the QFHD resolution, includes a encoder 2 and a decoder 3. Due to that of the display frames being compressed, the data cycles of accessing the display frames may be shorter, and the penalty cycles is less, too.

An input port of the encoder 2 is connected to a display write memory access unit (DWMAU) 4. After compressing display frame pixels, the encoder 2 then writes the compressed data into an external DRAM 5 via an AHB (ARM High-speed Serial Bus) 6; wherein the exemplary illustrations of the display frame pixels and compressed data are illustrated in following FIGS. 8 and 9.

While compressing display frame pixel data through the encoder 2 of the compression system 1 of the present invention, the most situations are that the difference between a display frame pixel and a previous display frame pixel is 1, or the display frame pixel is the same as the previous display frame pixel. Therefore, the way of predicting a pixel based on a previous pixel thereof may get rid of most residue data. The encoder 2 has a pixel dictionary with three reference pixels. The initial values of the three reference pixels are 8'hff, 8'h00 and 8'h01 respectively; wherein the exemplary illustration of the pixel dictionary is illustrated in following FIGS. 8 and 9.

The display frame pixel is input into the input port of the encoder 2 for calculation, an output port of the encoder 2 outputs encoded codewords and prediction-failed pixels. Each input pixel by the encoder 2 is compared with the three reference pixels in the pixel dictionary. If the input pixel is the same as any of the three reference pixels, the codewords may then be encoded as a dictionary pointer as 2' b00, 2' b01 or 2' b10 corresponding to a reference pixel, and none of the prediction-failed pixels will be output; if the input pixel is not the same as any of the three reference pixels, the codewords are encoded, that is, one codeword is encoded as 2' b11, and the input pixel may be output in the form of a prediction-failed pixel; wherein the exemplary illustrations of the output codewords and prediction-failed pixels are illustrated in following FIGS. 8 and 9.

After encoding the input pixels, the pixel dictionary is updated according to the input pixels. Even an input pixel is the same as any of the reference pixels, the pixel dictionary is still updated. That is, the correlation of most display frame pixels and adjacent pixels thereof is about height. In addition, using the dictionary pointers to clearly indicate the update of the reference pixels is unnecessary, on the contrary, the comparison is proceeded sequentially according to the input pixels, then all the reference pixels are updated simultaneously; wherein the exemplary illustrations of the input pixels, the adjacent pixels thereof and the dictionary pointers are illustrated in following FIGS. 8 and 9.

The decoder 3 fetches the compressed data from the external DRAM 5 via the AHB, continuously de-compresses the compressed data to display frame pixels, then transmits the display frame pixels to a display controller 7.

According to the present invention, the compression system 1 for display frames of QFHD (quad full high definition) resolution is applied to the image encoding/decoding environment of the H.264/AVC image encoding standard of the QFHD resolution. While proceeding the compression method for the display frames through the effective dictionary base compression and de-compression algorithm, the image data compression rate can be tremendously increased at the resolution of 1080 HD (High Definition) content, and the average memory data rate is greatly decreased as well, such as the decreased average memory data rate. Hence only a bus with a lower frequency as 57 MHz can be done for the real-time of the resolution of 1080 HD content.

Figure 2:
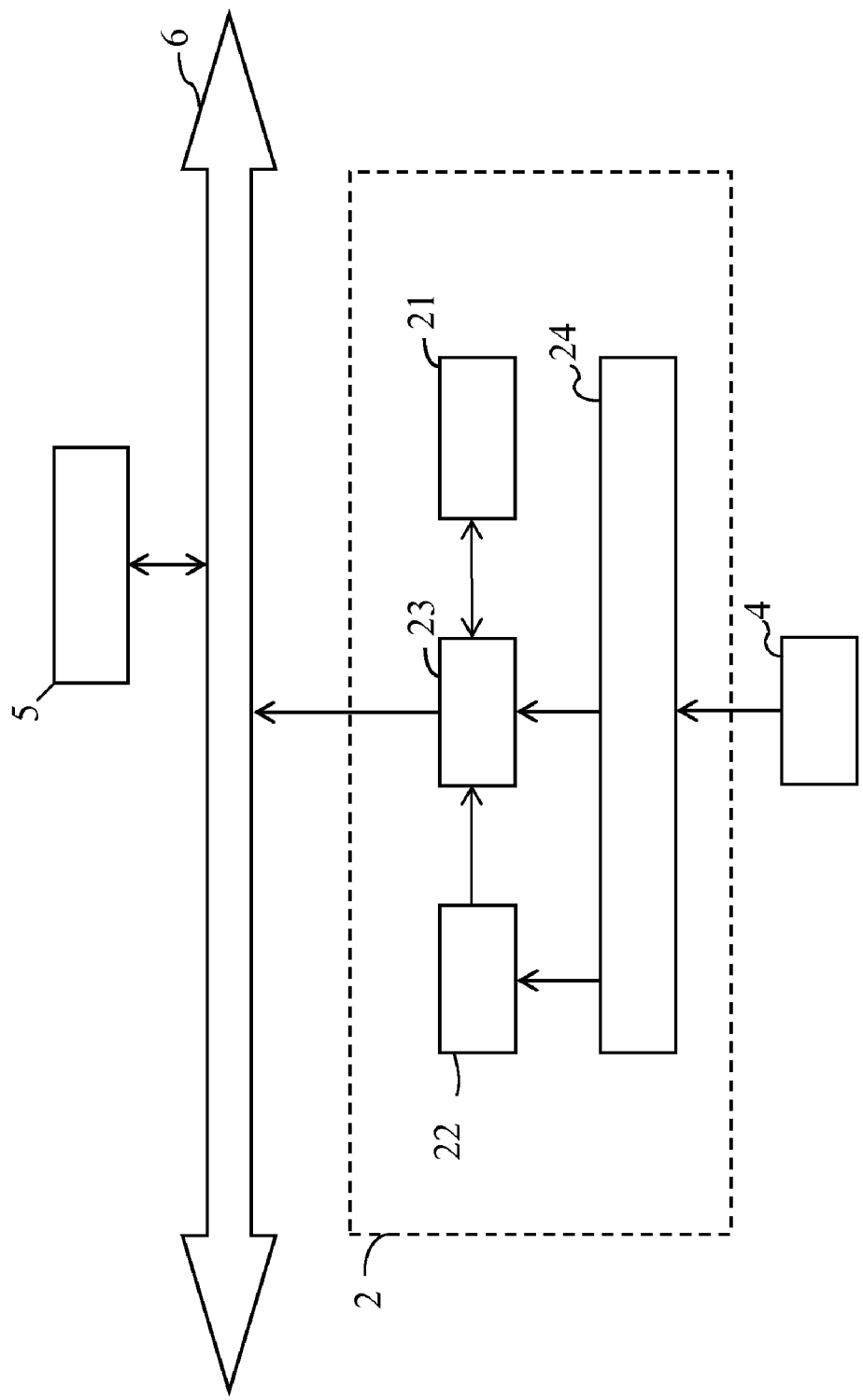
FIG. 2 illustrates a schematic view of the structure of the encoder of the present invention.

With reference to FIG. 2, which illustrates a schematic view of the structure of the encoder of the present invention. As shown in FIG. 2, The encoder 2 includes an internal SRAM 21, a display compressor core 22 with a compression algorithm, a display compressor address generator (DCAG) 23, and a display frame compression finite state machine (DFCFSM) 24.

While compressing the display frame pixel data, the display frame pixels from the display write memory access unit (DWMAU) 4 are transmitted to the display frame compression finite state machine (DFCFSM) 24, the display frame compression finite state machine (DFCFSM) 24 categorizes the display frame pixels as Y, Cb and Cr.

The display frame compression finite state machine (DFCFSM) 24 transmits the Y, Cb and Cr to the display compressor core 22, the display compressor core 22 compresses the Y, Cb and Cr to a parallel type and transmits the compressed Y, Cb and Cr to the display compressor address generator (DCAG) 23.

The display compressor address generator (DCAG) 23 writes the compressed data into the internal SRAM 21; and the display compressor address generator (DCAG) 23 writes the compressed data in the internal SRAM 21 into the external DRAM 5 via the AHB 6.

Figure 3:
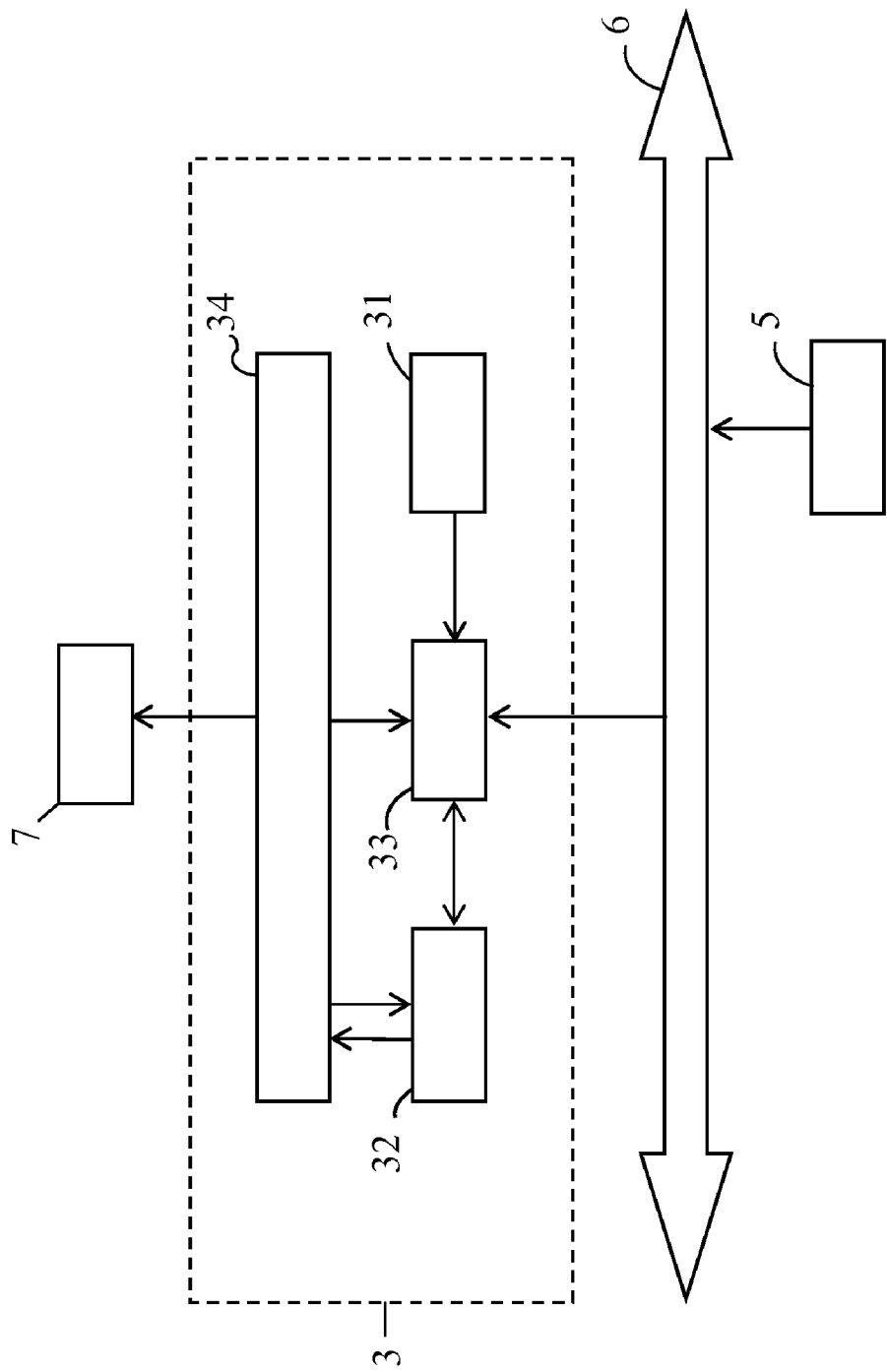
FIG. 3 illustrates a schematic view of the structure of the decoder of the present invention.

With reference to FIG. 3, which illustrates a schematic view of the structure of the decoder of the present invention. As shown in FIG. 3, the decoder 3 includes a compressed display frame SRAM 31, a display de-compression core 32 with a de-compression algorithm, a display de-compressor address generator (DDAG) 33, and a display frame de-compression finite state machine (DFDFSM) 34.

While de-compressing the display frame pixel data, the display de-compressor address generator 33 fetches the compressed data from the external DRAM 5 and storing the compressed data into the compressed display frame SRAM 31.

Figure 8:
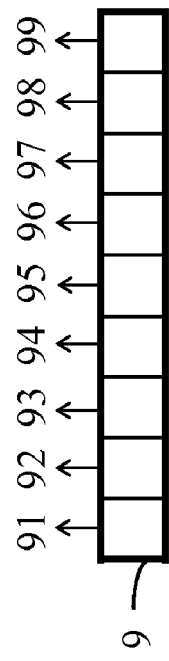
FIG. 8 illustrates a schematic view of a first preferred embodiment of the compression system for the display frames having the compression algorithm of the present invention.
Figure 9:
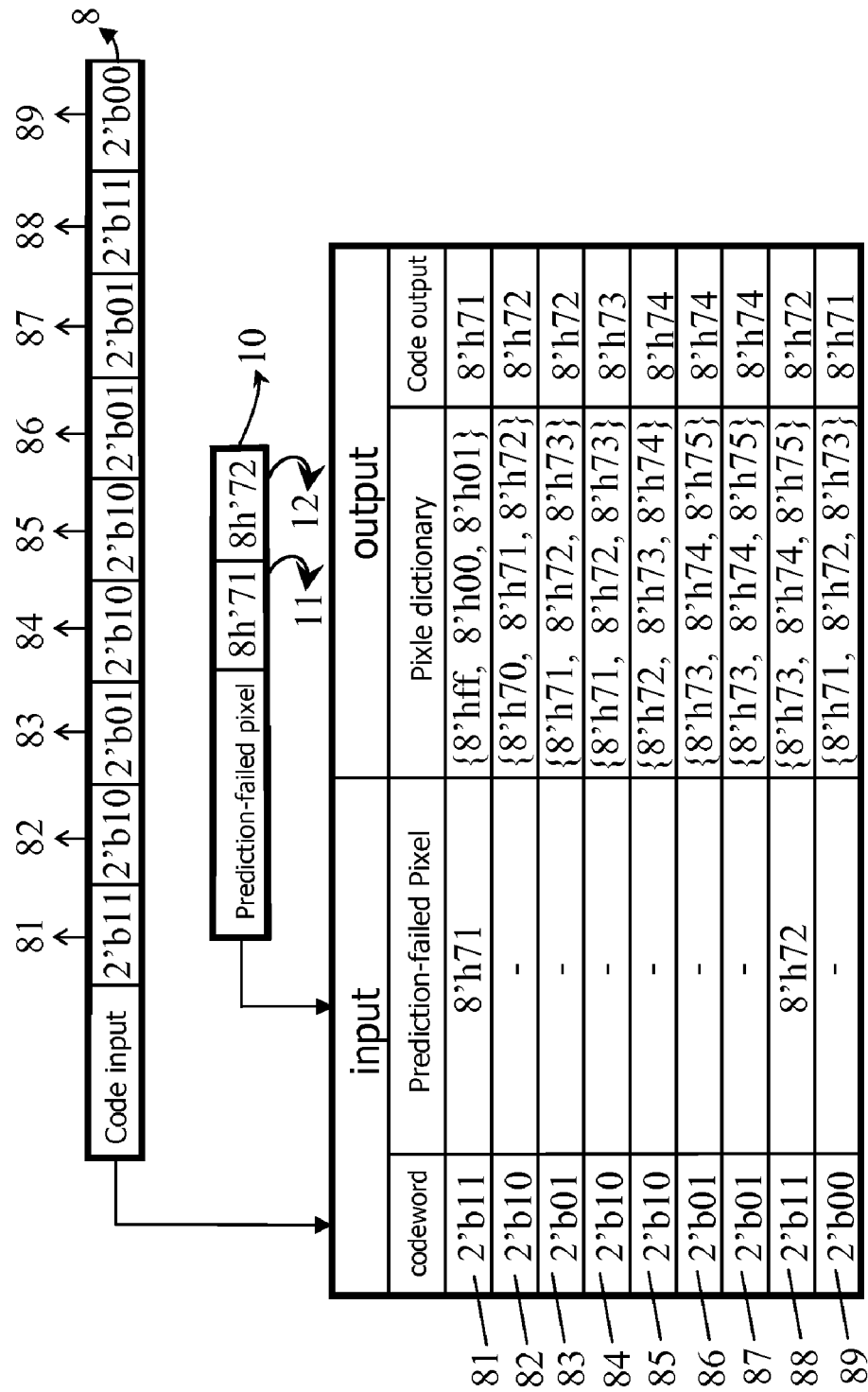
FIG. 9 illustrates a schematic view of a second preferred embodiment of the compression system for the display frames having the de-compression algorithm of the present invention.

The display de-compressor address generator 33 transmits part of the codewords and/or prediction-failed pixels from the compressed display frame SRAM 31 to the display de-compression core 32; wherein the exemplary illustrations of the codewords and the prediction-failed pixels are illustrated in following FIGS. 8 and 9.

The display de-compressor core 32 with the de-compression algorithm de-compresses the compressed data as an individual Y, an individual Cb and an individual Cr respectively and transmits the Y, Cb and Cr to the display frame de-compression finite state machine (DFDFSM) 34.

The display frame de-compression finite state machine 34 concatenates the de-compressed Y, Cb and Cr as a special arrangement defined by the display controller 7, the display frame de-compression finite state machine 34 then transmits the special arrangement pixels to the display controller 7.

With reference to FIG. 4, which illustrates a flow chart of the compression method for display frames of QFHD (quad full high definition) resolution. While compressing display frame pixel data through the encoder 2 the compression system 1 of the present invention, the most situations are that the difference between a display frame pixel and a previous display frame pixel is 1, or the display frame pixel is the same as the previous display frame pixel. Therefore the way of predicting each pixel based on a previous pixel thereof may get rid of most residue data.

Referring to FIG. 4, and simultaneously referring to FIG. 8, there are shown a schematic view of the compression system for the display frames having the compression algorithm of the present invention. As shown in FIG. 4 and FIG. 8, step 101 is that of the display frame compression system 1 compressing the display frame pixel data, wherein the encoder 2 has a pixel dictionary with three reference pixels, the initial values of the three reference pixels being 8'hff, 8'h00 and 8'h01 respectively, the input port of the encoder 2 being connected to the MAU 4, and each input pixel by the encoder 2 being compared with the three reference pixels in the pixel dictionary, after the encoder 2 compressing the display frame pixels, the encoder 2 writing the compressed data of the encoded codewords and/or the prediction-failed pixels into the external DRAM 5; Then, going to step 102.

After finishing Step 101, following Step 102 is that of the decoder 3 fetching the compressed data of the encoded codewords and the prediction-failed pixels, and de-compressing the compressed data to display frame pixels, and then the display frame pixels being transmitted to the display controller 7, hence the display frame pixels being completely decoded and the same as the display frame pixels originally input into the input port of the encoder 2.

With reference to FIG. 5, which illustrates a detail flow chart of compressing the display frame pixel data of FIG. 4. As shown in FIG. 5, step 111 is that of comparing each pixel input by the encoder 2 with the three reference pixels of the pixel dictionary of the encoder 2, determining whether each input pixel is the same as any reference pixel of the pixel dictionary, if yes, going to step 112, if no, going to step 113.

For step 112, if each input pixel is the same as any reference pixel of the pixel dictionary, the codewords are encoded to corresponding dictionary pointers of the reference pixels, such as 2' b00, 2' b01 and 2' b10, and prediction-failed pixels may not be output, then the pixel dictionary is updated, and using the dictionary pointers to clearly indicate the update of the reference pixels is unnecessary.

For step 113, if each input pixel is not the same as the three reference pixels of the pixel dictionary, the codewords are encoded, that is, one codeword is encoded as 2' b11, and the input pixel may be output in the form of a prediction-failed pixel.

Figure 6:
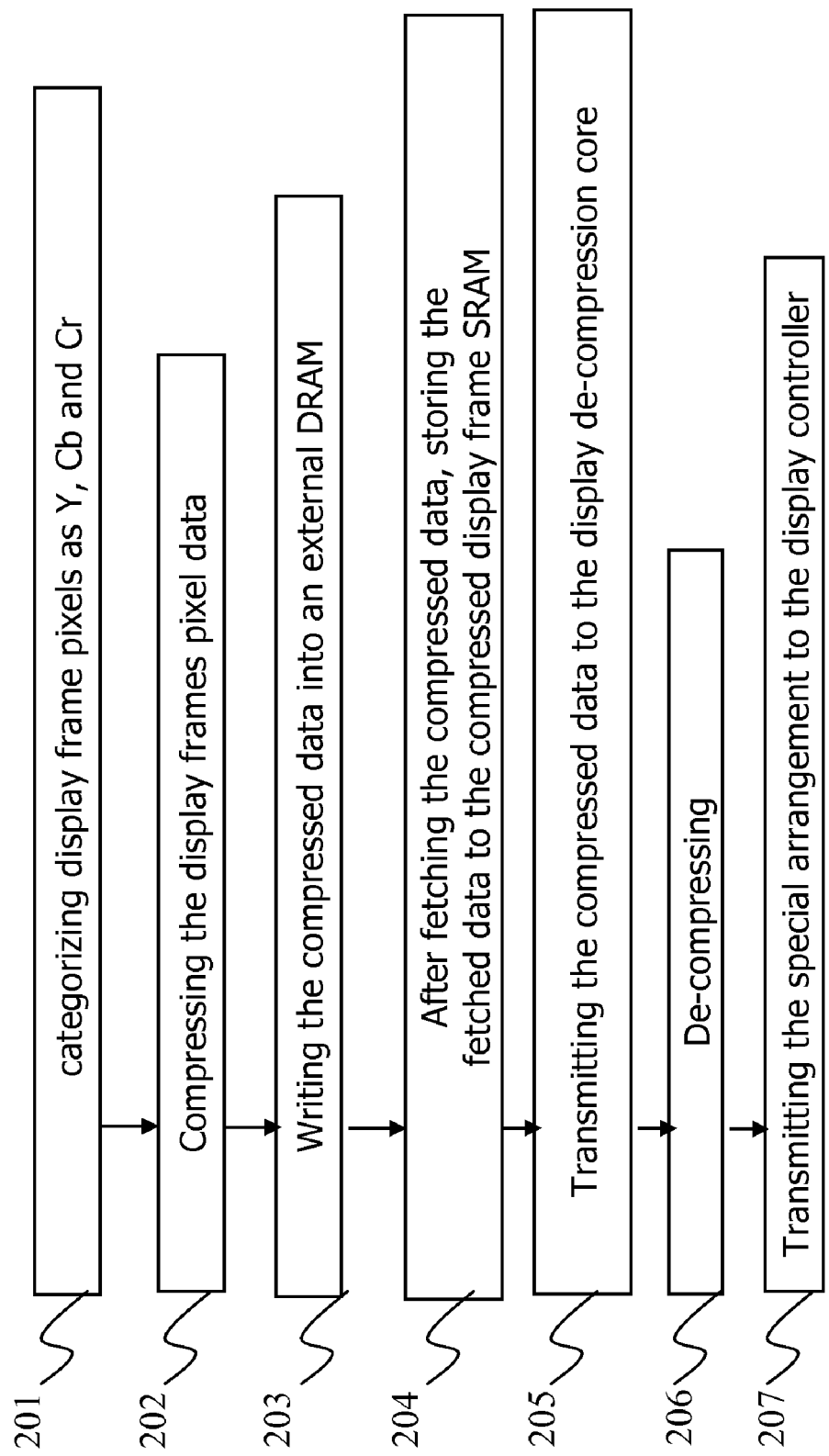
FIG. 6 illustrates a flow chart of using the compression system for the display frames of the QFHD (quad full high definition) resolution to proceed the compression method of the display frames of FIG. 1 and FIG. 2 of the present invention.

With reference to FIG. 6, which illustrates a flow chart of using the compression system for the display frames of the QFHD (quad full high definition) resolution to proceed the compression method of the display frames of FIG. 1 and FIG. 2 of the present invention. In addition, please refer to FIG. 9, there are shown a schematic view of the compression system for the display frames having the compression algorithm of the present invention. As shown in FIG. 6 and FIG. 9, step 201 is that of the display frame pixels being transmitted to a display frame compression finite state machine (DFCFSM) 24, and the display frame compression finite state machine (DFCFSM) 24 categorizing the display frame pixels as Y, Cb and Cr and transmitting the Y, Cb and Cr to a display compressor core 22, then going to step 202.

Step 202 is that of proceeding the compression of the display frame pixel data, the encoder having a pixel dictionary with three reference pixels, the initial values of the three reference pixels are 8'hff, 8'h00 and 8'h01 respectively, the display compressor core 22 with the compression algorithm comparing each input pixel by the encoder 2 with the three reference pixels of the pixel dictionary, the display compressor core 22 then compressing the display frame pixels and compressing the Y, Cb and Cr to a parallel type, continuously transmitting the compressed Y, Cb and Cr to the display compressor address generator (DCAG) 23, then going to step 203.

Step 203 is that of the display compressor address generator (DCAG) 23 writing the compressed data of the encoded codewords and/or the prediction-failed pixels into the internal SRAM 21, and the display compressor address generator (DCAG) 23 writing the compressed data in the internal SRAM 21 into the external DRAM 5, then going to step 204.

Step 204 is that of the display de-compressor address generator (DDAG) 33 of the decoder 3 fetching the compressed data of the encoded codewords and/or the prediction-failed pixels from the external DRAM 5 via the AHB 6, and storing the compressed data into the compressed display frame SRAM 31, then going to step 205.

Step 205 is that of the display de-compressor address generator (DDAG) 33 transmitting part of the codewords and/or prediction-failed pixels from the compressed display frame SRAM 31 to the display de-compression core 32 with the de-compression algorithm, then going to step 206.

Step 206 is that of the display de-compressor core 32 de-compressing the compressed data to the display frame pixels (not shown in the figure); the display de-compressor core 32 de-compressing the compressed data as an individual Y, an individual Cb and an individual Cr respectively and transmitting the Y, Cb and Cr to a display frame de-compression finite state machine (DFDFSM) 34, then going to step 207.

Step 207 is that of the display frame de-compression finite state machine 34 concatenating the de-compressed Y, Cb and Cr as a special arrangement defined by the display controller 7, the display frame de-compression finite state machine 34 then transmitting the special arrangement pixels to the display controller 7, hence the display frame pixels being completely decoded and the same as the display frame pixels originally input into the input port of the encoder 2.

Figure 7:
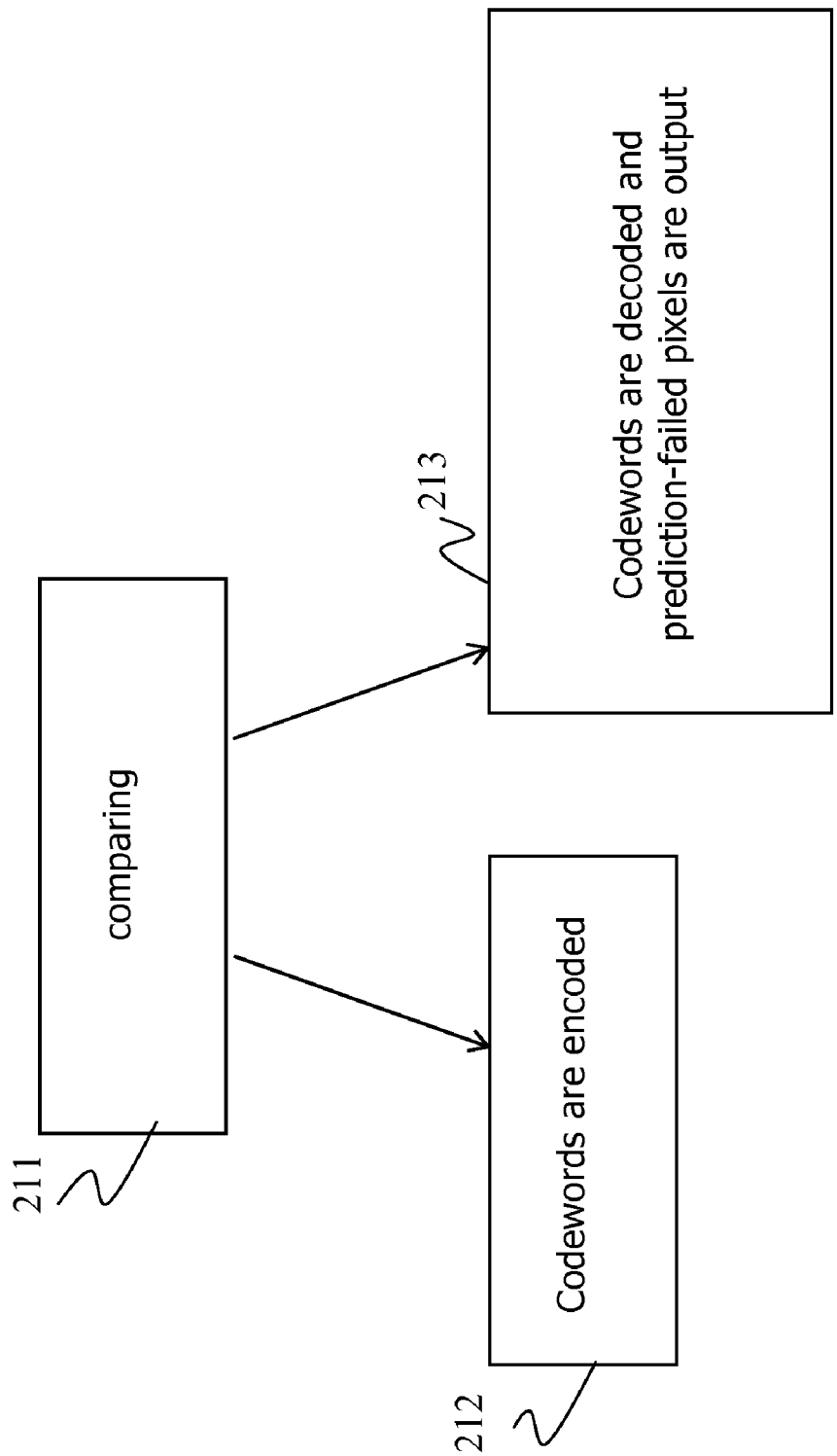
FIG. 7 illustrates a detail flow chart of compressing the display frame pixel data of FIG. 6.

With reference to FIG. 7, which illustrates a detail flow chart of compressing the display frame pixel data of FIG. 6. As shown in FIG. 7, step 211 is that of comparing each pixel input by the encoder 2 with the three reference pixels of the pixel dictionary of the encoder 2, determining whether each input pixel is the same as any reference pixel of the pixel dictionary, if yes, going to step 212, if no, going to step 213.

For step 212, if each input pixel is the same as any reference pixel of the pixel dictionary, the codewords are encoded to corresponding dictionary pointers of the reference pixels, such as 2' b00, 2' b01 and 2' b10, and prediction-failed pixels may not be output, then the pixel dictionary is updated, and using the dictionary pointers to clearly indicate the update of the reference pixels is unnecessary.

For step 213, if each input pixel is the same as the three reference pixels of the pixel dictionary, the codewords are encoded, that is, one codeword is encoded as 2' b11, and the input pixel may be output in the form of a prediction-failed pixel, then the pixel dictionary is updated, and using the dictionary pointers to clearly indicate the update of the reference pixels is unnecessary.

With reference to FIG. 8, which illustrates a schematic view of a first preferred embodiment of the compression system for the display frames having the compression algorithm of the present invention. As shown in FIG. 8, the display compressor core 22 with the compression algorithm is compressing the display frame pixels. The input pixel data 9 includes the pixels 91, 92, 93, 94, 95, 96, 97, 98, and 99. From the pixel 91 to 99, the nine pixel data are 8' h71, 8' h72, 8' h73, 8' h74, 8' h74, 8' h72, and 8' h71.

Firstly, the pixel dictionary is activated, and the first display frame pixel 91 is 8' h71. Due to that none of the values of the reference pixels is 8' h71, the output codeword and the prediction-failed pixel are 2' b11 and 8' h71 respectively. Secondly, the pixel dictionary is updated to 8' h70(71−1), 8' h71(71) and 8' h72(71+1) before encoding the second input pixel 92. Due to that the second input pixel 92 is the same as the third reference pixel 8' h72, the encoded codeword is 2' b10. Continuously, the pixel dictionary is updated to 8' h71 (72−1), 8' h72(72) and 8' h73(72+1). According to the compression algorithm, the original nine pixels 91 to 99, total 72 bits), will be compressed to nine codewords, total 18 bits, and two prediction-failed pixels, total 16 bits. Hence, the image data compression rate can be tremendously increased, for instance, the compression rate of 53% in this embodiment; and the average memory data rate is greatly decreased, such as the decreased average memory data rate of about 33%. Therefore, only a bus with a lower frequency as 57 MHz can be done for the real-time of the resolution of 1080 HD content.

For the compression method, the quantity of the reference pixels is $2^n-1$, wherein n is the width of a codeword, the possibility to hit the target of a prediction is raised with the increase of n. However, the total bit number of a codeword is increased as well. Thus, a best mode for the length of a codeword can be chosen so as to optimize the compressed data.

With reference to FIG. 9, which illustrates a schematic view of a second preferred embodiment of the compression system for the display frames having the compression algorithm of the present invention. As shown in FIG. 9, the display de-compressor core 32 with the de-compression algorithm is de-compressing the display frame pixels. The input code 8 includes nine encoded codes 81 to 89, which are 2' b11, 2' b10, 2' b01, 2' b10, 2' b10, 2' b01, 2' b11, and 2' b00. The prediction-failed pixel 10 includes the two prediction-failed pixels 11 and 12, which two pixel data are 8' h71 and 8' h72 respectively.

Firstly, the initial values of the reference pixels of the pixel dictionary are 8' hff, 8' h00 and 8 h01 in the period of compression. The first codeword 81 is 2' b11, which means the first display pixel is not compressed from the pixel dictionary. Thus, a first prediction-failed pixel 11 is needed. Then, the pixel dictionary is updated to 8' h70(71−1), 8' h71(71) and 8' h72(71+1). The second codeword 82 is 2' b10, that is to say 8' h72 of the third pixel of the pixel dictionary is the same as the second display frame pixel. Hence, the pixel dictionary is updated to 8' h71(72−1), 8' h72(72) and 8' h73(72+1).

After proceeding the de-compression algorithm, the nine display frame pixels are completely decoded and the same as the nine display frame pixels input into the input port of the encoder 2.

As a conclusion, the present invention is to provide the compression method and the compression system for the display frames of the QFHD (quad full high definition) resolution, which are applied to the image encoding/decoding environment of the H.264/AVC image encoding standard of the QFHD resolution. While proceeding the effective dictionary base compression and de-compression algorithms of the display frames of the present invention, the image data compression rate can be tremendously increased at the resolution of 1080 HD (High Definition) content, and the average memory data rate is greatly decreased. Hence only a bus with a lower frequency as 57 MHz can be done for the real-time of the resolution of 1080 HD content. The advantages of the compression method and the compression system for the display frames of the QFHD (quad full high definition) resolution are listed as follows:

1. The present invention provides the compression method and the compression system for the display frames of the QFHD (quad full high definition) resolution, which are applied to the image encoding/decoding environment of the H.264/AVC image encoding standard of the QFHD resolution. By way of proceeding the effective dictionary base compression and de-compression algorithms of the display frames of the present invention, the image data compression rate can be tremendously increased, and the average memory data rate is greatly decreased.

2. While proceeding the compression method for the display frames, the image data compression rate can be tremendously increased at the resolution of 1080 HD (High Definition) content, for instance, the average compression rate of 54%; and the average memory data rate is greatly decreased, such as the decreased average memory data rate of about 33%. Hence only a bus with a lower frequency as 57 MHz can be done for the real-time of the resolution of 1080 HD content.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A compression method for display frames of QFHD (quad full high definition) resolution, which is applied to the image encoding/decoding environment of the H.264/AVC image encoding standard of the QFHD resolution, comprising the steps of:
   (1) comparing each pixel input into an encoder with each reference pixel of the pixel dictionary of the encoder, wherein the pixel dictionary has three reference pixels and the initial values of the three reference pixels are 8'hff, 8'h00 and 8'h01 respectively;
   (2) the encoder writing encoded codewords and/or compressed and prediction-failed pixel data into an external DRAM via an AHB (ARM High-speed Serial Bus); and
   (3) the decoder fetching the encoded codewords and/or compressed and prediction-failed pixel data from the external DRAM via the AHB, continuously de-compressing the compressed data to display frame pixels, then transmitting the display frame pixels to a display controller.

2. A compression system for display frames of QFHD (quad full high definition) resolution, which is applied to the image encoding/decoding environment of the H.264/AVC image encoding standard of the QFHD resolution, comprising:
   an encoder, an input port of the encoder being connected to a display write memory access unit (DWMAU), the encoder comparing each input pixel with each reference pixel of the pixel dictionary of the encoder, and then writing the compressed data of encoded codewords and/or prediction-failed pixels into an external DRAM via an AHB (ARM High-speed Serial Bus); and
   a decoder, the decoder fetching the encoded codewords and/or compressed and prediction-failed pixel data from the external DRAM via the AHB, continuously de-compressing the compressed data to display frame pixels, then transmitting the display frame pixels to a display controller; wherein the pixel dictionary has three reference pixels, and the initial values of the three pixels are 8'hff, 8'h00 and 8'h01 respectively.

3. The compression system for the display frames of the QFHD (quad full high definition) resolution according to claim 2, wherein the encoder comprises:
   a display frame compression finite state machine (DFCFSM), the display frame pixels from the MAU being transmitted to the DFCFSM, which categorizes the display frame pixels as Y, Cb and Cr;
   a display compressor core, which receives the Y, Cb and Cr from the DFCFSM and compresses the Y, Cb and Cr to a parallel type;

a display compressor address generator (DCAG), which receives the parallel type via the display compressor core; and an internal SRAM, the display compressor address generator (DCAG) writing the compressed data into the internal SRAM and then writing the compressed data of the internal SRAM into the external DRAM via the AHB.

4. The compression system for the display frames of the QFHD (quad full high definition) resolution according to claim 2, wherein the decoder comprises:

a display de-compressor address generator (DDAG), which fetches the compressed data from the external DRAM;

a compressed display frame SRAM, the display de-compressor address generator (DDAG) storing the fetched compressed data to the compressed display frame SRAM;

a display de-compressor core, the display de-compressor address generator (DDAG) transmitting part of the codewords and the prediction-failed pixels from the compressed display frame SRAM to the display de-compressor core, the display de-compressor core with a de-compression algorithm then de-compressing the compressed data as an individual Y, an individual Cb and an individual Cr; and a display frame de-compression finite state machine (DFDFSM), the display de-compressor core transmitting the de-compressed individual Y, Cb and Cr to the display frame de-compression finite state machine (DFDFSM), the display frame de-compression finite state machine (DFDFSM) concatenating the de-compressed Y, Cb and Cr as a special arrangement and transmitting the special arrangement pixels to the display controller.

* * * * *